United States Patent
Tsai et al.

(10) Patent No.: US 10,133,367 B2
(45) Date of Patent: Nov. 20, 2018

(54) AIR PRESSURE SENSING TYPE MOUSE

(71) Applicant: PRIMAX ELECTRONICS LTD., Taipei (TW)

(72) Inventors: Cheng-Yi Tsai, Taipei (TW); Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/494,007

(22) Filed: Apr. 21, 2017

(65) Prior Publication Data

US 2018/0196531 A1    Jul. 12, 2018

(30) Foreign Application Priority Data

Jan. 6, 2017  (TW) .............................. 106100439 A (51) Int. Cl.
| | | |
|---|---|---|
| *G06F 3/0354* | (2013.01) | |
| *G01L 9/12* | (2006.01) | |
| *G06F 3/0346* | (2013.01) | |
| *G06F 3/038* | (2013.01) | |

(52) U.S. Cl.
CPC ............ *G06F 3/03543* (2013.01); *G01L 9/12* (2013.01); *G06F 3/0346* (2013.01); *G06F 3/0383* (2013.01)

(58) Field of Classification Search
CPC .. G06F 3/03543; G06F 3/0383; G06F 3/0346; G01L 9/12
See application file for complete search history.

(56) References Cited

U.S. PATENT DOCUMENTS

| | | | | |
|---|---|---|---|---|
| 4,736,640 A | * | 4/1988 | Hooks ................... | G06F 3/0346 73/866.1 |
| 5,006,836 A | * | 4/1991 | Cooper ............... | G06F 3/03543 273/148 B |
| 5,717,610 A | * | 2/1998 | Baba .................... | G06F 3/03543 345/157 |
| 5,923,318 A | * | 7/1999 | Zhai ...................... | G06F 3/0346 345/156 |
| 6,135,876 A | * | 10/2000 | Song .................... | G06F 3/03543 345/163 |
| 6,489,948 B1 | * | 12/2002 | Lau ...................... | G06F 3/03543 345/159 |
| 7,696,980 B1 | * | 4/2010 | Piot ........................ | G06F 3/0346 345/157 |
| 9,703,398 B2 | * | 7/2017 | Butler ..................... | G06F 3/017 |
| 2002/0057255 A1 | * | 5/2002 | Masao ................... | G06F 3/0346 345/156 |
| 2004/0017357 A1 | * | 1/2004 | Kinoshita ............. | G01F 1/6845 345/163 |

(Continued)

*Primary Examiner* — Grant Sitta
(74) *Attorney, Agent, or Firm* — Kirton McConkie; Evan R. Witt (57) ABSTRACT

An air pressure sensing type mouse includes a housing, a circuit board, plural air pressure sensors and a processor. One of the plural air pressure sensors is a middle air pressure sensor. The processor stores a threshold value. When an ambient airflow inputs into the housing of the mouse, the plural pressure sensors sense the ambient airflow and generates plural sensed values. If the plural sensed values are all smaller than the threshold value, the middle air pressure sensor generates a pressing signal. If the plural sensed values are all higher than the threshold value, the middle air pressure sensor generates a vertical displacement signal.

6 Claims, 7 Drawing Sheets

(56) References Cited

U.S. PATENT DOCUMENTS

| | | | |
|---|---|---|---|
| 2007/0069088 A1* | 3/2007 | Bidiville | G06F 3/03543 248/188.9 |
| 2008/0297478 A1* | 12/2008 | Hotelling | G06F 21/32 345/163 |
| 2010/0073293 A1* | 3/2010 | Itagaki | G06F 3/03543 345/163 |
| 2010/0312498 A1* | 12/2010 | Hamann | G01F 1/6842 702/45 |
| 2011/0004327 A1* | 1/2011 | Bonnat | G06F 3/011 700/83 |
| 2011/0107958 A1* | 5/2011 | Pance | G06F 3/016 116/205 |
| 2011/0199305 A1* | 8/2011 | Suh | G06F 3/014 345/158 |
| 2011/0224919 A1* | 9/2011 | Lan | G01F 1/00 702/45 |
| 2013/0027299 A1* | 1/2013 | Tsukahara | G06F 1/1694 345/157 |
| 2013/0222347 A1* | 8/2013 | Riedel | B64D 45/00 345/175 |
| 2014/0069212 A1* | 3/2014 | Fishel | G01L 1/02 73/862.581 |
| 2015/0219608 A1* | 8/2015 | Choi | G01N 33/0004 73/23.2 |

* cited by examiner

AIR PRESSURE SENSING TYPE MOUSE

FIELD OF THE INVENTION

The present invention relates to a mouse, and more particularly to an air pressure sensing type mouse.

BACKGROUND OF THE INVENTION

Figure 1:
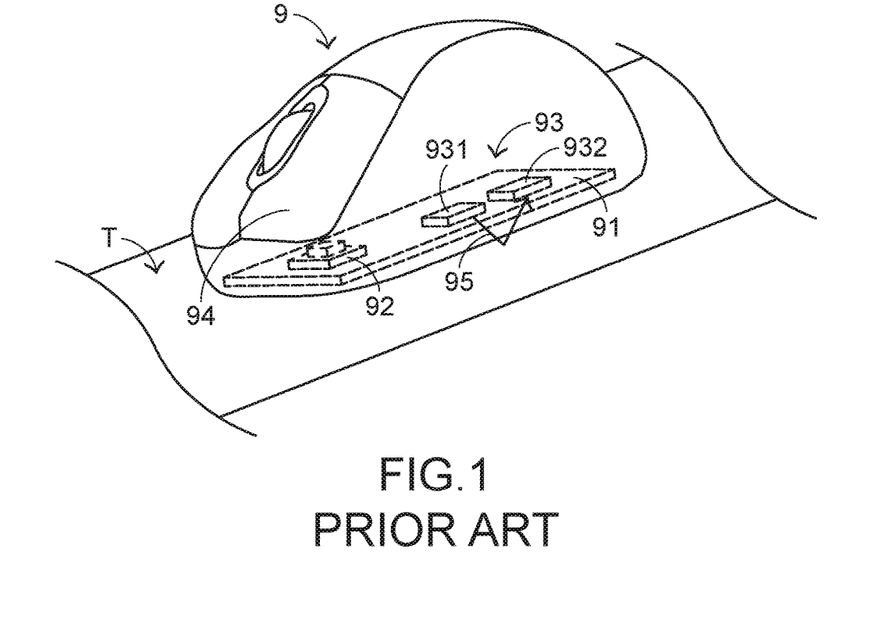
FIG. 1 schematically illustrates the structure of a conventional mouse.

A mouse is a widely-used input device of a computer for controlling the movement of a computer cursor and inputting a command to the computer. Generally, a mouse comprises an optical sensor and plural mouse buttons. The optical sensor is used for generating a cursor displacement signal. The mouse button is used for generating a command, e.g., a command of launching a specified program. FIG. 1 schematically illustrates the structure of a conventional mouse. As shown in FIG. 1, the mouse 9 is placed on a desk surface T. As the mouse 9 is moved on the desk surface T, the location of the cursor on a display screen (not shown) is corresponding moved. A circuit board 91 is disposed within the mouse 9. A button switch 92 and an optical sensor 93 are disposed on the circuit board 91. The optical sensor 93 comprises a light emitter 931 and a light receiver 932. The button switch 92 is disposed under a pressing shell 94 of the mouse. When the pressing shell 94 is pressed down to push the button switch 92, the button switch 92 generates a button signal (not shown). The light emitter 931 emits a light beam 95 from an inner portion of the mouse. When the light beam 95 is irradiated on the desk surface T, the light beam 95 is reflected to the light receiver 932. That is, the optical sensor 93 detects the planar movement of the mouse 9 on the desk surface T and controls the movement of the computer cursor according to the detecting result.

As mentioned above, a physical pressing action is necessary for the button switch of the conventional mouse to generate the button signal. Moreover, the mouse needs to be operated on a desk surface or a flat surface. If the mouse is placed in the air, the movement of the mouse cannot be judged because the light beam cannot be reflected to the mouse by the desk surface. Moreover, the conventional mouse is only able to sense the planar displacement along the X-Y axial direction, but unable to sense the vertical displacement along the Z axial direction.

In other words, the conventional mouse needs to be further improved.

SUMMARY OF THE INVENTION

For solving the drawbacks of the conventional technology, the present invention provides an air pressure sensing type mouse that is operable on a flat surface and in the air.

In accordance with an aspect of the present invention, there is provided an air pressure sensing type mouse. The air pressure sensing type mouse includes a housing, a circuit board, plural air pressure sensors and a processor. The housing has a top surface. The top surface has a first opening, a second opening and a third opening. The circuit board is disposed within the housing. The plural air pressure sensors are installed on the circuit board, and include a middle air pressure sensor, a right air pressure sensor and a left air pressure sensor. The middle air pressure sensor is aligned with the first opening to sense an ambient airflow through the first opening and generate a first sensed value. The right air pressure sensor is aligned with the second opening to sense the ambient airflow through the second opening and generate a second sensed value. The left air pressure sensor is aligned with the third opening to sense the ambient airflow through the third opening and generate a third sensed value. The processor is installed on the circuit board and electrically connected with the middle air pressure sensor, the right air pressure sensor and the left air pressure sensor. The processor includes a middle signal generator and a comparing unit. The middle signal generator is connected with the middle air pressure sensor to generate a first pressing signal or a vertical displacement signal. The comparing unit is connected with the middle air pressure sensor, the right air pressure sensor, the left air pressure sensor and the middle signal generator. In addition, the comparing unit stores a threshold value. When the airflow inputs into the housing through the first opening, the second opening and the third opening simultaneously, the comparing unit receives the first sensed value, the second sensed value and the third sensed value. Moreover, if the first sensed value, the second sensed value and the third sensed value are all higher than the threshold value, the comparing unit generates a switching command to the middle signal generator. When only the middle signal generator receives the first sensed value, the middle signal generator generates the first pressing signal according to the first sensed value. When the middle signal generator receives the switching command, the middle signal generator generates the vertical displacement signal according to the first sensed value.

In an embodiment, the processor further includes a right signal generator that is connected with the right air pressure sensor. When the ambient airflow inputs into the housing through the second opening, the right air pressure sensor generate the second sensed value and the right signal generator generates a second pressing signal according to the second sensed value.

In an embodiment, the processor further includes a left signal generator that is connected with the left air pressure sensor. When the ambient airflow inputs into the housing through the third opening, the left air pressure sensor generate the third sensed value and the left signal generator generates a third pressing signal according to the third sensed value.

In an embodiment, after the middle signal generator receives the switching command and the middle signal generator generates the vertical displacement signal according to the first sensed value, the comparing unit receives the first sensed value, the second sensed value and the third sensed value again, and if the first sensed value, the second sensed value and the third sensed value are all lower than the threshold value, the comparing unit generates a restoring command to the middle signal generator. When the middle signal generator receives the restoring command, the middle signal generator generates the first pressing signal according to the first sensed value.

In an embodiment, the air pressure sensing type mouse further includes a vent. The vent is formed in the top surface of the housing. The ambient airflow that inputs into the housing further exits from the vent.

In an embodiment, the air pressure sensing type mouse further includes an indication lamp. The indication lamp is installed on the circuit board and connected with the processor to indicate whether the switching command is generated.

In an embodiment, the air pressure sensing type mouse further includes a planar displacement sensor. The planar displacement sensor is installed on the circuit board to generate a planar displacement signal.

The above objects and advantages of the present invention will become more readily apparent to those ordinarily

DETAILED DESCRIPTION OF THE PREFERRED EMBODIMENT

The present invention will now be described more specifically with reference to the following embodiments and accompanying drawings.

Figure 2:
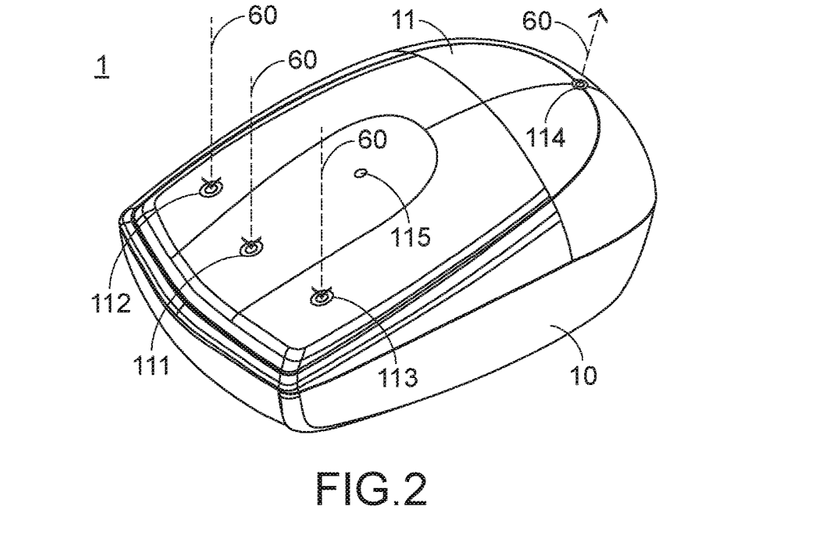
FIG. 2 is a schematic perspective view illustrating a mouse according to an embodiment of the present invention.
Figure 3:
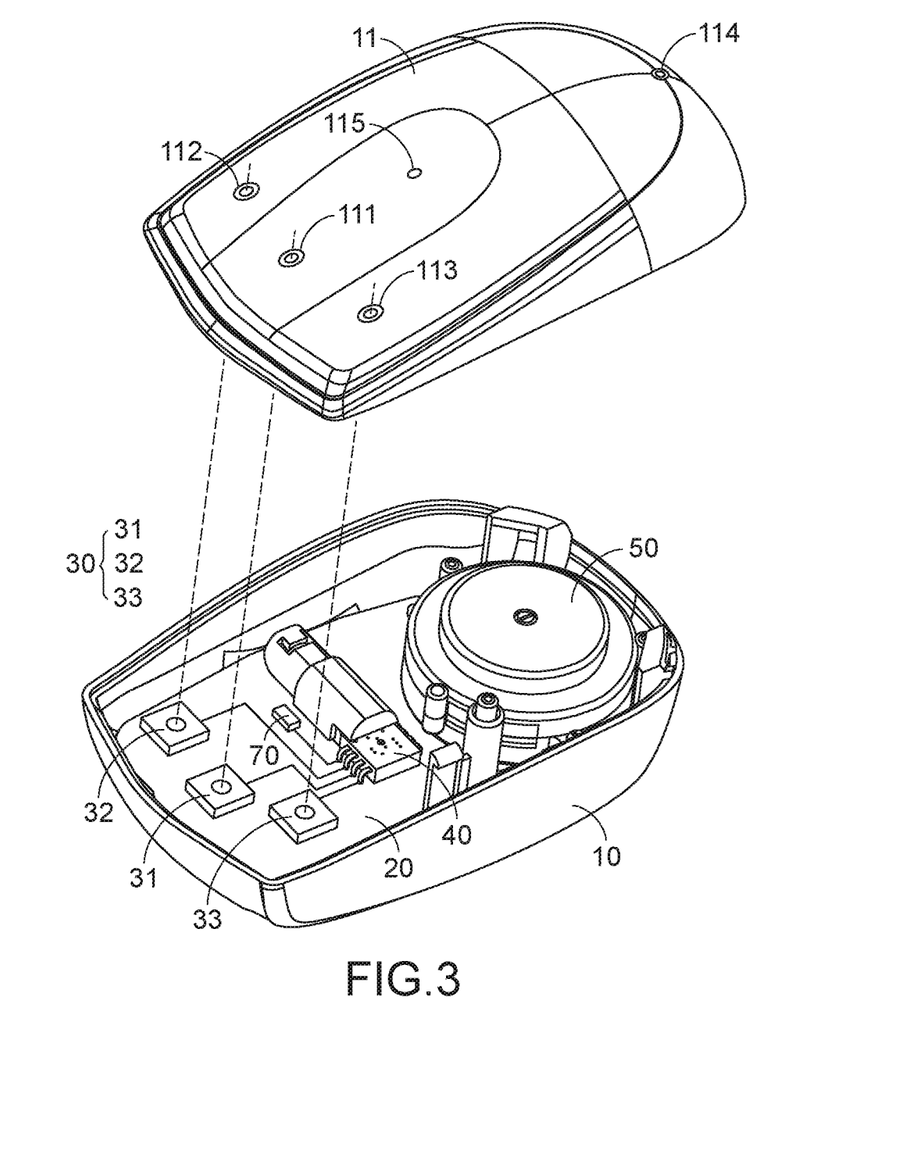
FIG. 3 is a schematic exploded view illustrating the mouse according to the embodiment of the present invention.

FIG. 2 is a schematic perspective view illustrating a mouse according to an embodiment of the present invention. FIG. 3 is a schematic exploded view illustrating the mouse according to the embodiment of the present invention. The mouse 1 of the present invention in an air pressure sensing type mouse. The mouse 1 comprises a housing 10, a circuit board 20, plural air pressure sensors 30, a processor 40, a planar displacement sensor 50 and an indication lamp 70. The housing 10 comprises a top surface 11. The top surface 11 has a first opening 111, a second opening 112, a third opening 113 and a vent 114. The ambient airflow 60 can flow into the inner portion of the housing 10 through the first opening 111, the second opening 112 and the third opening 113 and exits from the housing 10 through the vent 114.

The plural air pressure sensors 30 include a middle air pressure sensor 31, a right air pressure sensor 32 and a left air pressure sensor 33.

Figure 7:
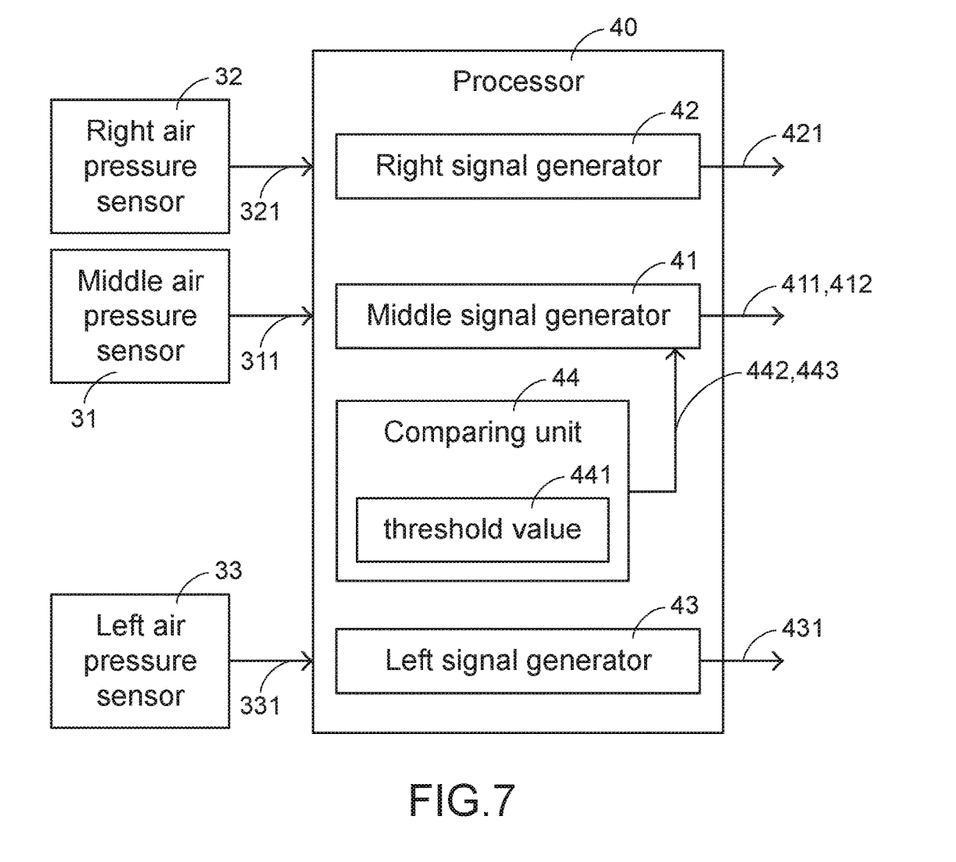
FIG. 7 is a schematic functional block diagram illustrating a signal processing system of the mouse according to an embodiment of the present invention.

The processor 40 comprises a middle signal generator 41, a right signal generator 42, a left signal generator 43 and a comparing unit 44, which are shown in FIG. 7.

The circuit board 20 is disposed within the housing 10. All of the plural air pressure sensors 30, the processor 40, the planar displacement sensor 50 and the indication lamp 70 are installed on the circuit board 20.

The plural air pressure sensors 30, the planar displacement sensor 50 and the indication lamp 70 are electrically connected with the processor 40. The middle air pressure sensor 31 is disposed under the first opening 111. The right air pressure sensor 32 is disposed under the second opening 112. The left air pressure sensor 33 is disposed under the third opening 113. The middle signal generator 41 is connected with the middle air pressure sensor 31 to generate a first pressing signal 411 (see FIG. 7) or a vertical displacement signal 412 (see FIG. 7). The right signal generator 42 is connected with the right air pressure sensor 32 to generate a second pressing signal 421 (see FIG. 7). The left signal generator 43 is connected with the left air pressure sensor 33 to generate a third pressing signal 431 (see FIG. 7). The comparing unit 44 is electrically connected with the middle air pressure sensor 31, the right air pressure sensor 32, the left air pressure sensor 33 and the middle signal generator 41 (see FIG. 7). The comparing unit 44 is used for generating a switching signal 442 (see FIG. 7).

Figure 4:
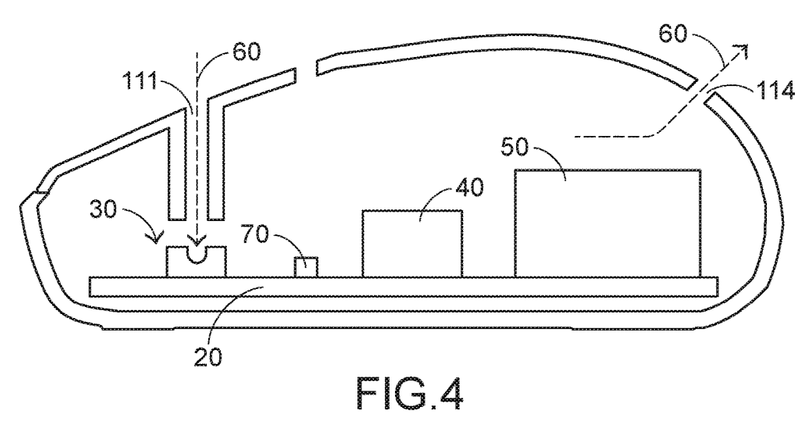
FIG. 4 schematically illustrating the path of the ambient airflow inputting into the mouse and outputting from the mouse.
Figure 5:
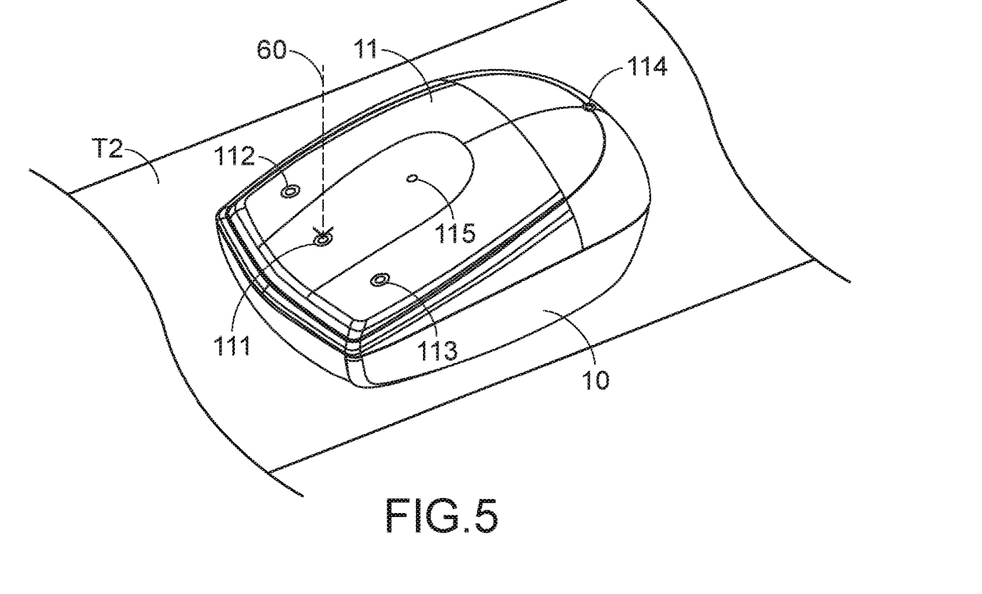
FIG. 5 schematically illustrating an example of inputting the ambient airflow into the mouse though the first opening.
Figure 6:
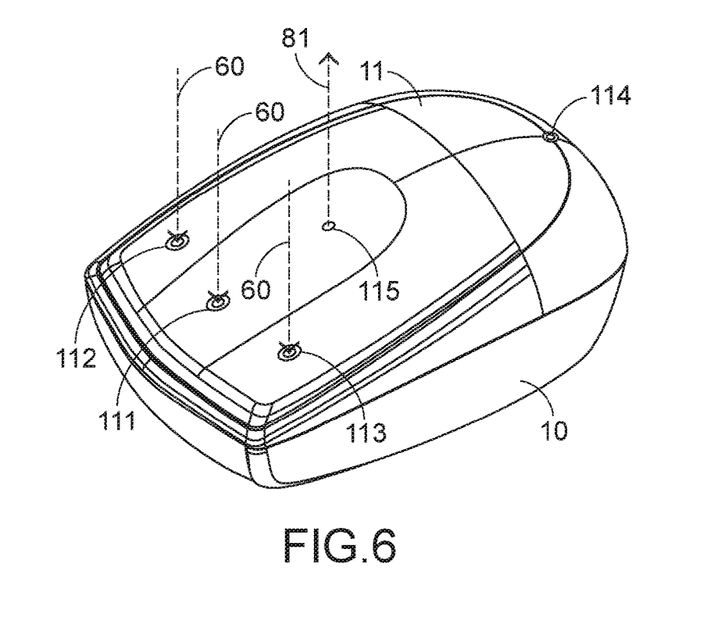
FIG. 6 schematically illustrating an example of inputting the ambient airflow into the mouse though the first opening, the second opening and the third opening simultaneously.

Hereinafter, the principles of generating signals by the air pressure sensors 30 will be illustrated with reference to FIGS. 4, 5 and 6. FIG. 4 schematically illustrating the path of the ambient airflow inputting into the mouse and outputting from the mouse. FIG. 5 schematically illustrating an example of inputting the ambient airflow into the mouse though the first opening. FIG. 6 schematically illustrating an example of inputting the ambient airflow into the mouse though the first opening, the second opening and the third opening simultaneously.

Please refer to FIGS. 4, 5 and 6. When the plural air pressure sensors 30 are triggered by the ambient airflow 60, a corresponding signal is generated. For example, when one or more of the user's fingers are placed on the opening 111, 112 and/or 113 of the mouse 1, the ambient airflow 60 is generated. Alternatively, when the mouse 1 is moved to the air along a vertical direction, the ambient airflow 60 is generated. As shown in FIG. 5, the mouse 1 is placed on a desk surface T2. When only the first opening 111 is pressed by the user, the air near the first opening 111 is compressed in response to the pressing action. Consequently, the ambient airflow 60 is generated, and the ambient airflow 60 inputs into the housing 10 through the first opening 111 to trigger the middle air pressure sensor 31. Under this circumstance, the middle signal generator 41 generates the first pressing signal 411. Similarly, when the mouse 1 is placed on a desk surface T2 and the second opening 112 is pressed by the user, the right signal generator 42 is triggered to generate the second pressing signal 421. Similarly, when the mouse 1 is placed on a desk surface T2 and the third opening 113 is pressed by the user, the left signal generator 43 is triggered to generate the third pressing signal 431.

As shown in FIG. 6, the mouse 1 is moved to the air. While the mouse 1 is moved to the air along the vertical direction, the air near the openings 111, 112 and 113 is pushed in response to the moving action. Consequently, the ambient airflow 60 is generated. At the same time, the ambient airflow 60 inputs into the housing 10 through the first opening 111, the second opening 112 and the third opening 113 to trigger the middle air pressure sensor 31, the right air pressure sensor 32 and the left air pressure sensor 33. When the middle air pressure sensor 31, the right air pressure sensor 32 and the left air pressure sensor 33 are triggered simultaneously, the comparing unit 44 of the processor 40 generates the switching command 442 to the middle signal generator 41. Then, if the ambient airflow 60 inputs into the housing 10 through the first opening 111 to trigger the middle air pressure sensor 31 again, the middle signal generator 41 generates the vertical displacement signal 412 for controlling the cursor movement along the vertical direction (i.e., the X axial direction). Moreover, the switching command 442 is also transmitted from the comparing unit 44 to the indication lamp 70. According to the switching command 442, the indication lamp 70 emits a light beam 81 to prompt the user that the mouse 1 is placed in the air.

A process of generating the associated signals will be described as follows. FIG. 7 is a schematic functional block diagram illustrating a signal processing system of the mouse according to an embodiment of the present invention. The comparing unit 44 stores a threshold value 441. When the mouse 1 is placed on the desk surface and the first opening 111 is pressed, the middle air pressure sensor 31 is triggered to generate a first sensed value 311, and the middle signal generator 41 generates the first pressing signal 411 according to the first sensed value 311. When the mouse 1 is placed on the desk surface and the second opening 112 is pressed, the right air pressure sensor 32 is triggered to generate a second sensed value 321, and the right signal generator 42 generates the second pressing signal 421 according to the second sensed value 321. When the mouse 1 is placed on the desk surface and the third opening 113 is pressed, the left air pressure sensor 33 is triggered to generate a third sensed value 331, and the left signal generator 43 generates the third pressing signal 431 according to the third sensed value 331.

When the mouse 1 is moved to the air, the ambient airflow 60 inputs into the housing 10 through the first opening 111, the second opening 112 and the third opening 113. Consequently, the middle air pressure sensor 31, the right air pressure sensor 32 and the left air pressure sensor 33 are triggered simultaneously. Under this circumstance, the middle air pressure sensor 31 generates the first sensed value 311, the right air pressure sensor 32 generates the second sensed value 321, and the left air pressure sensor 33 generates the third sensed value 331. Then, the first sensed value 311, the second sensed value 321 and the third sensed value 331 are simultaneously received by the comparing unit 44. Then, the comparing unit 44 compares the first sensed value 311, the second sensed value 321 and the third sensed value 331 with the threshold value 441. If the first sensed value 311, the second sensed value 321 and the third sensed value 331 are all higher than the threshold value 441, the comparing unit 44 generates the switching command 442 to the middle signal generator 41. Then, if the ambient airflow 60 inputs into the housing 10 of the mouse 1 in the air through the first opening 111 to trigger the middle air pressure sensor 31 to generate the first sensed value 311 again, the middle signal generator 41 generates the vertical displacement signal 412 according to the first sensed value 311.

While the mouse 1 is moved from the air to the desk surface, the airflow within the housing 10 exits from the housing 10 through the first opening 111, the second opening 112 and the third opening 113. Consequently, the internal pressure within the housing 10 decreases. At the same time, the middle air pressure sensor 31, the right air pressure sensor 32 and the left air pressure sensor 33 are simultaneously triggered to generate the first sensed value 311, the second sensed value 321 and the third sensed value 331, respectively. Then, the comparing unit 44 compares the first sensed value 311, the second sensed value 321 and the third sensed value 331 with the threshold value 441. If the first sensed value 311, the second sensed value 321 and the third sensed value 331 are all lower than the threshold value 441, the comparing unit 44 generates a restoring command 443 to the middle signal generator 41. Then, if the ambient airflow 60 inputs into the housing 10 through the first opening 111 to trigger the middle air pressure sensor 31 to generate the first sensed value 311 again, the middle signal generator 41 generates the first pressing signal 411 according to the first sensed value 311.

Figure 8:
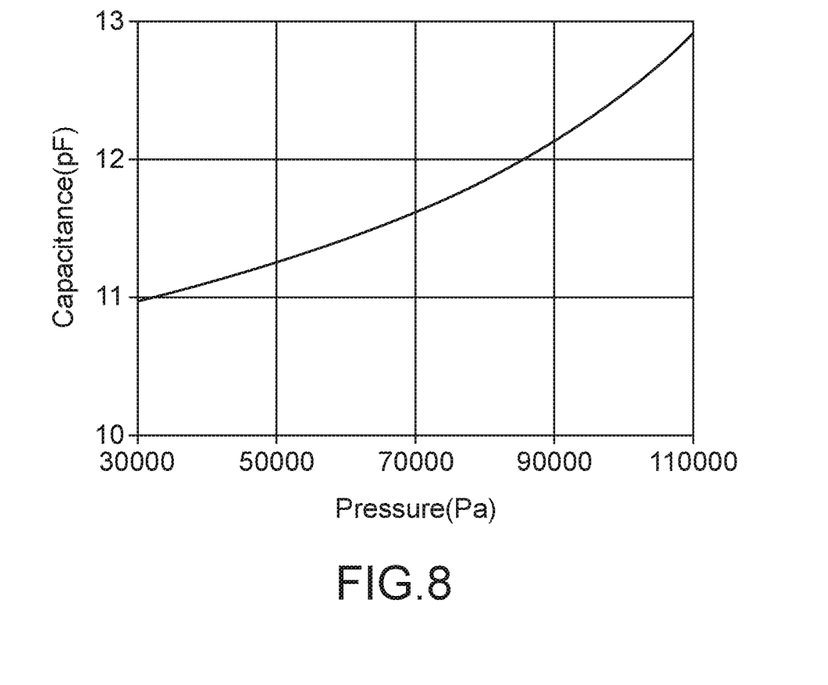
FIG. 8 is a plot illustrating the relationship between the pressure value of the ambient airflow and the capacitance value measured by the air pressure sensors of the mouse according to the embodiment of the present invention.

FIG. 8 is a plot illustrating the relationship between the pressure value of the ambient airflow and the capacitance value measured by the air pressure sensors of the mouse according to the embodiment of the present invention. The principle of setting the threshold value 441 will be described as follows. In an embodiment, the first sensed value 311, the second sensed value 321 and the third sensed value 331 generated by the plural air pressure sensors 30 are capacitance values. When the air pressure of the ambient airflow 60 touches the electronic components (not shown) of the air pressure sensors 30, the electronic components generate the corresponding capacitance values in the unit of picofarad (pF). In an embodiment, the threshold value 441 is set as 11 pF, and the air pressure is in the unit of Pascal (Pa). When the mouse 1 is placed on the desk surface, the air pressure of the ambient airflow 60 is lower than 30,000 Pa. Under this circumstance, the first sensed value 311, the second sensed value 321 and the third sensed value 331 generated by the plural air pressure sensors 30 are all lower than 11 pF. While the mouse 1 is lifted to the air, a great deal of ambient airflow 60 inputs into the housing 10 because of the vertical movement. Consequently, the air pressure within the housing 10 is higher than 30,000 Pa. Under this circumstance, the first sensed value 311, the second sensed value 321 and the third sensed value 331 generated by the plural air pressure sensors 30 are all higher than 11 pF. According to the comparing result, the comparing unit 44 judges that the mouse 1 is in the air and generates the switching command 442.

Figure 9:
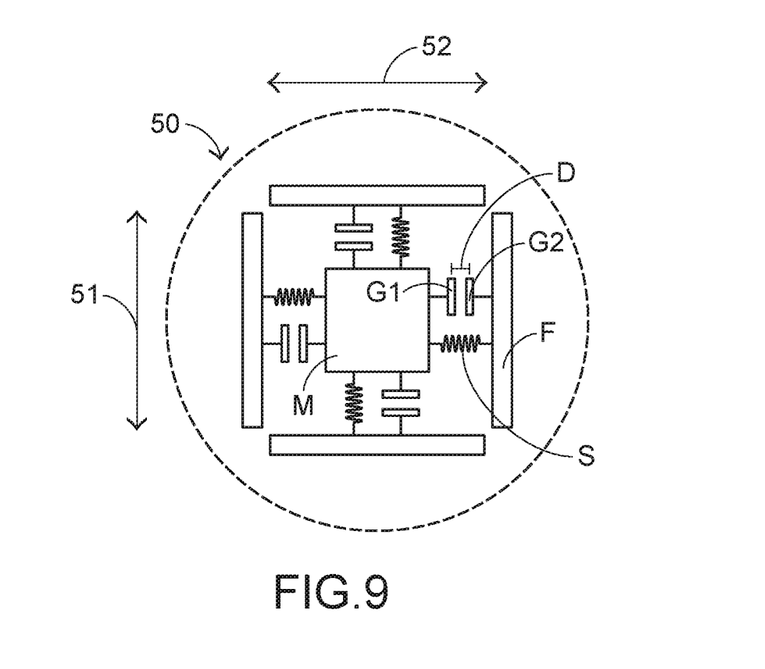
FIG. 9 schematically illustrates the structure of the planar displacement sensor of the mouse according to the embodiment of the present invention.

The function of the planar displacement sensor 50 will be described as follows. FIG. 9 schematically illustrates the structure of the planar displacement sensor of the mouse according to the embodiment of the present invention. As shown in FIG. 9, the planar displacement sensor 50 comprises plural fixed elements F, a movable element M, plural connection elements S and plural magnetic elements G1, G2. The fixed elements F and the movable element M are connected through the connection elements S. The magnetic elements G1 are connected with the movable element M. The magnetic elements G2 are connected with the fixed elements F. When the mouse 1 is placed on the desk surface or the mouse 1 is placed in the air and moved along the planar direction (i.e., the X-Y axial direction), the movable element M is shifted to be close to or away from the fixed elements F. The distance D between the magnetic elements G1 and G2 is correspondingly increased or decreased. According to the magnetic force between the magnetic elements G1 and G2, a corresponding electric signal (not shown) is generated. According to the electric signal, the processor 40 generates planar displacement signals 51 and 52.

Figure 10:
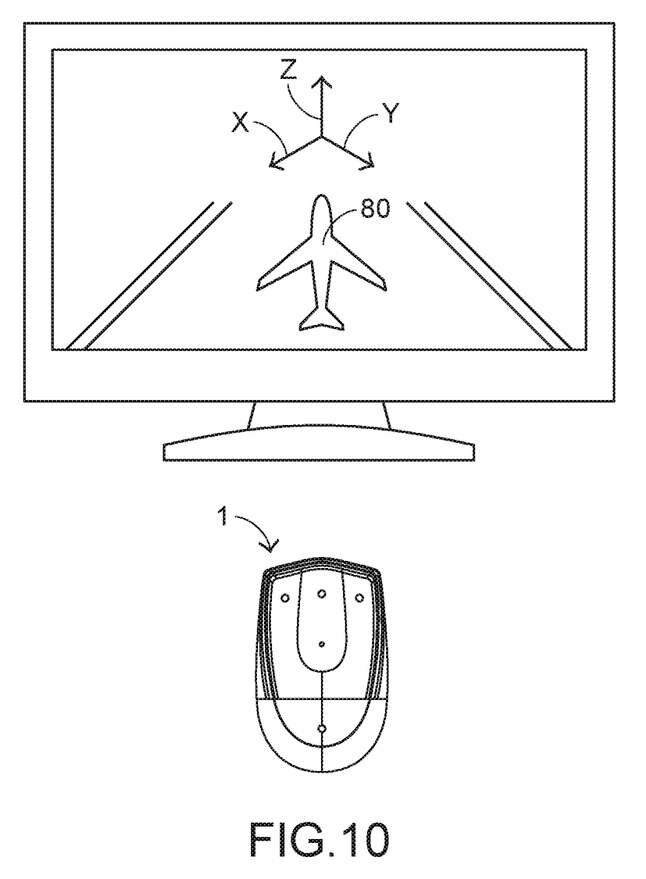
FIG. 10 schematically illustrates a usage scenario of the mouse according to the embodiment of the present invention.

FIG. 10 schematically illustrates a usage scenario of the mouse according to the embodiment of the present invention. For example, the mouse 1 is placed in the air to control a game object 80. As shown in FIG. 10, the computer game has a three-dimensional space (3D space). By operating the mouse 1 of the present invention, the game object 80 can be controlled and move in the three-dimensional space. When the mouse 1 is lifted and moved in the air, the two planar displacement signals 51 and 52 and the vertical displacement signal 412 are generated. The planar displacement signal 51 is the moving signal of the game object 80 along the X axial direction. The planar displacement signal 52 is the moving signal of the game object 80 along the Y axial direction. The vertical displacement signal 412 is the moving signal of the game object 80 along the Z axial direction. By controlling the movement of the game object 80 in the three-dimensional space along the X, Y and Z axial directions, the user can play the computer game.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An air pressure sensing type mouse, comprising:
   a housing having a top surface, wherein the top surface has a first opening, a second opening and a third opening;
   a circuit board disposed within the housing;
   plural air pressure sensors installed on the circuit board, and including a middle air pressure sensor, a right air pressure sensor and a left air pressure sensor, wherein the middle air pressure sensor is aligned with the first opening to sense an ambient airflow through the first opening and generate a first sensed value, the right air pressure sensor is aligned with the second opening to sense the ambient airflow through the second opening and generate a second sensed value, and the left air pressure sensor is aligned with the third opening to sense the ambient airflow through the third opening and generate a third sensed value;
   a processor installed on the circuit board and electrically connected with the middle air pressure sensor, the right air pressure sensor and the left air pressure sensor, wherein the processor comprises a middle signal generator and a comparing unit, the middle signal generator is connected with the middle air pressure sensor to generate a first pressing signal or a vertical displacement signal, the comparing unit is connected with the middle air pressure sensor, the right air pressure sensor, the left air pressure sensor and the middle signal generator, and the comparing unit stores a threshold value; and
   a vent, wherein the vent is formed in the top surface of the housing, and the ambient airflow that inputs into the housing further exits from the vent,
   wherein when the airflow inputs into the housing through the first opening, the second opening and the third opening simultaneously, the comparing unit receives the first sensed value, the second sensed value and the third sensed value, and if the first sensed value, the second sensed value and the third sensed value are all higher than the threshold value, the comparing unit generates a switching command to the middle signal generator, wherein when only the middle signal generator receives the first sensed value, the middle signal generator generates the first pressing signal according to the first sensed value, wherein when the middle signal generator receives the switching command, the middle signal generator generates the vertical displacement signal according to the first sensed value.

2. The air pressure sensing type mouse according to claim 1, wherein the processor further comprises a right signal generator that is connected with the right air pressure sensor, wherein when the ambient airflow inputs into the housing through the second opening, the right air pressure sensor generate the second sensed value and the right signal generator generates a second pressing signal according to the second sensed value.

3. The air pressure sensing type mouse according to claim 1, wherein the processor further comprises a left signal generator that is connected with the left air pressure sensor, wherein when the ambient airflow inputs into the housing through the third opening, the left air pressure sensor generates the third sensed value and the left signal generator generates a third pressing signal according to the third sensed value.

4. The air pressure sensing type mouse according to claim 1, wherein after the middle signal generator receives the switching command and the middle signal generator generates the vertical displacement signal according to the first sensed value, the comparing unit receives the first sensed value, the second sensed value and the third sensed value again, and if the first sensed value, the second sensed value and the third sensed value are all lower than the threshold value, the comparing unit generates a restoring command to the middle signal generator, wherein when the middle signal generator receives the restoring command, the middle signal generator generates the first pressing signal according to the first sensed value.

5. The air pressure sensing type mouse according to claim 1, further comprising an indication lamp, wherein the indication lamp is installed on the circuit board and connected with the processor to indicate whether the switching command is generated.

6. The air pressure sensing type mouse according to claim 1, further comprising a planar displacement sensor, wherein the planar displacement sensor is installed on the circuit board to generate a planar displacement signal.

* * * * *